Jan. 22, 1935.　　　W. M. THOMAS　　　1,988,882

LENS STRUCTURE WITH PRISMS

Filed April 4, 1934

INVENTOR:
WILLIAM M. THOMAS
By Clyde L. Rogers
his ATTORNEY.

Patented Jan. 22, 1935

1,988,882

UNITED STATES PATENT OFFICE 1,988,882

LENS STRUCTURE WITH PRISMS

William M. Thomas, Los Angeles, Calif.

Application April 4, 1934, Serial No. 718,985

6 Claims. (Cl. 88—16.4)

This application is in part a continuation of my co-pending application entitled "Lens structure with prisms" filed December 5th, 1933, Serial No. 700,964, now Patent Number 1,957,371.

My invention relates to a novel lens structure for use in conjunction with a camera or other photographic apparatus, as well as to a photographic apparatus including this lens structure in novel relationship. The embodiments to be hereinafter described are particularly applicable to a system of taking still or motion pictures, though the principles of the invention may be applied with equal facility to a projection system wherein it is desired to superimpose constituent images. Furthermore, the features of the invention are applicable both to the taking and projecting of black-and-white pictures and colored pictures.

It is an object of the present invention to use a single-lens system in front of a film and in conjunction with a beam-splitting structure for forming the light rays passing through the single-lens system into two identical beams, or for combining two light beams so that they can be moved through a single-lens system when used for projection purposes. The use of a single-lens system permits the photographing of objects from a single viewpoint, or the projecting of images from a single-lens system as distinguished from a plurality of lens systems.

One application of the invention is in conjunction with the taking or projecting of colored motion pictures. In the additive system of producing colored pictures, adjacent frames of the motion picture film are exposed through two or more color filters of different color to form color-value images. When such color-value images are projected through correspondingly colored filters, the images can be brought into correct superimposition so as to form a composite image the colors of which correspond to the colors of the object originally photographed. In the embodiment of the invention to be hereinafter described, only two color filters are used, though it is within the scope of the present invention to utilize a larger number of such filters.

When projecting adjacent film images so as to form a composite image, it is essential that corresponding points on the two images be correspondingly placed with respect to the adjacent frames or image areas. In exposing such images it has been found that, in the absence of any correcting means, a change in focus of the lens system will change the spacing of corresponding points on the adjacent film images so as to preclude the possibility of projecting these images in superimposed relationship. Stated in other words, corresponding points on the two film images will not be spaced a constant distance from each other when the focus of the lens system is changed, so that any attempt to superimpose the images by bringing the frames thereof or boundaries of the image areas into registration, as is done in the projection system, results in the formation of two images rather than a single composite image. It is an object of the present invention to provide a lens structure including a single-lens system and a simple correcting means which not only permits the formation of two images on the film, but which also automatically maintains corresponding portions of these images spaced a constant distance from each other regardless of a movement of the lens system to change the objective field of focus.

Even if properly positioned film images are produced, attempts to project such images onto screens positioned varying distances from the lens system result in failure unless compensating means is provided for bringing the images into superimposed relationship. Thus, while a lens structure can be designed to operate satisfactorily in conjunction with a screen at a fixed distance from the projector, the images will not be superimposed if the screen is moved closer to the projector, for instance, and if the focus of the lens system is correspondingly changed to secure sharp screen images. If we consider light rays drawn from corresponding points on the adjacent film images, it is necessary that these rays intersect in a point on the screen regardless of the distance between the screen and the lens system. It is an object of the present invention to provide a system for accomplishing this result automatically as the focus of the lens system is changed.

Following the principles to be hereinafter set forth, the lens structure of the invention finds particular utility in conjunction with cameras utilizing 16 mm. film or smaller, wherein lenses having a focal distance of 2" or greater are used. With larger sizes of film, or with smaller focal distances, distortion in varying amounts may be present in a 16 mm. system, though in some instances this distortion is not sufficiently apparent to negative the utility of the lens structure with this size of film or even with larger sizes of film. It is an object of the present invention to provide a lens structure which is particularly applicable to cameras using 16 mm. film or smaller, this structure having a focal distance of 2" or more.

Further objects and advantages of the invention will be made evident hereinafter.

Figure 1:
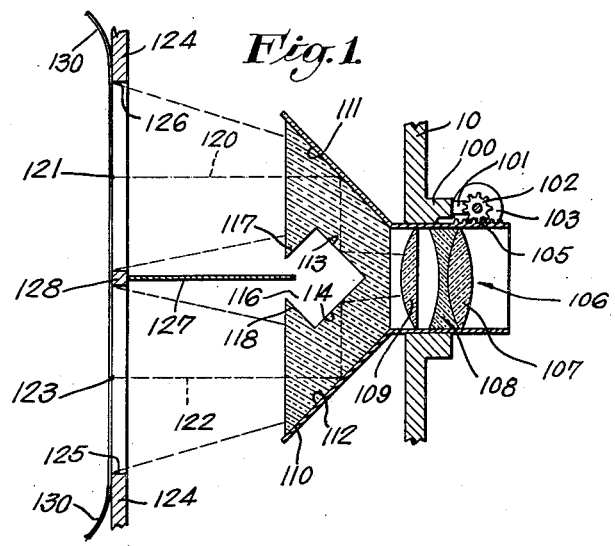
Fig. 1 is a diagrammatic sectional view illustrating a form of the invention.

Referring to Fig. 1 the lens system of my invention is shown in conjunction with a camera including a front wall 10. A film 130 moves from one reel to another in any conventional manner, this movement being effected frame-by-frame by any suitable film-advancing means not shown. This film moves adjacent an aperture plate 124 including apertures 125 and 126 separated by a wall 128, these apertures framing the adjacent images projected onto the film by the lens structure, as will be hereinafter described, identical images being simultaneously projected onto the film on adjacent image areas thereof.

In one type of camera it has been found desirable to advance the film 130 frame-by-frame so that each image area or frame thereof is twice exposed, once through the upper aperture 126 and again through the lower aperture 125. When such a system is used it is clear that the images must be identically positioned with respect to the boundaries of the image areas or frames, otherwise the image produced by the second exposure will not be superimposed on the image produced by the first exposure. Similarly, regardless of whether or not a double-exposure system is used, the images must be correspondingly positioned with respect to their respective frames or image areas if an attempt is later made to superimpose the adjacent images by simultaneous projection thereof or by other means.

It has been found, however, that with conventional lens systems corresponding points on the adjacent film areas will not be separated a constant distance when the objective field of focus is changed. Thus, while it is possible to design a lens structure which correctly registers on the adjacent image areas any object appearing in a given objective field of focus, any attempt to change this objective field of focus will result in the formation of images which cannot be superimposed. The lens system of the present invention automatically overcomes this defect.

In Fig. 1 I have illustrated a form of the invention which can be successfully used with 16 mm. film or with film of even larger size. Here, the front wall 10 is shown as including a sleeve 100 carrying bifurcations 101 between which is positioned a pinion 102. This pinion is mounted on a shaft extending through the bifurcations and a thumb wheel 103 is secured to this shaft so that by turning the thumb wheel the pinion 102 is rotated. This rotation is utilized in moving a barrel 105 in a forward-rearward direction, this barrel having teeth meshing with the pinion 102. Any suitable means not shown may be utilized for preventing any rotation of the barrel with respect to the front wall 10. This barrel contains a single-lens system 106 diagrammatically shown as comprising lens elements 107, 108, and 109.

The rear end of the barrel 105 carries a flared portion 110 in which is mounted a suitable prism means. In this form of the invention the prism means is of the reflecting type and includes outer reflecting surfaces 111 and 112 and inner reflecting surfaces 113 and 114. These surfaces may be suitably mirrored if desired or may be so disposed that total reflection takes place irrespective of any mirrored surface. The inner reflecting surfaces 113 and 114 may be formed by cutting a suitable groove 116 transversely through the prism means. It is preferable, however, to leave inward extending toes 117 and 118 at the front of this groove 116 so that the prism means may be formed substantially as shown in Fig. 1. These inwardly extending toes are extremely important in this system, in that they make possible the reflection to the film of the total light rays reflected by the inner and outer reflecting surfaces 113 and 111, and 114 and 112 without loss and without distortion. In some instances it is possible to form the mirrored surfaces independently of any glass therebetween in which case suitable supports must be used for these surfaces. The light rays reflected therebetween will then move through air rather than through a transparent prism material such as glass.

A light ray emanating from a common point in the objective field of focus passing through the lens system 106 will, for instance, be reflected by the inner reflecting surface 113 so that it reaches the outer reflecting surface 111, being thence reflected to form a ray 120 which reaches the film at a point 121. Similarly, a ray coming from the same point in the objective field of focus will pass through the lens system 106 and be reflected by the inner reflecting surface 114, after which it can be reflected by the outer reflecting surface 112 to form a ray 122 reaching the film at a point 123. The points 121 and 123 are positioned a distance apart substantially equal to the center-to-center spacing of the adjacent image areas on the film. Similarly, rays, emanating from any other point in the objective field of focus will be reflected to form point images on the film spaced from each other a distance substantially equal to the center-to-center spacing of the image areas or frames whereby two identical images of any object in the objective field of focus will be formed on adjacent image areas of the film.

In order to secure the best results, I have found it necessary to make the outer end of said prism means adjacent to the lens system and the inner ends of said prism means adjacent to the two film apertures, plane surfaces and parallel to each other; if, for instance, as was sometimes done in the prior art the inner ends of said prism means adjacent to the double apertures were made convex instead of plane, such convex curvature would have a tendency to focus the image reflected therethrough which would cause distortion of said images. Such distortion is eliminated when both front and rear ends of said prism means are made plane surfaces and parallel to each other.

In Fig. 1, I have illustrated the rays 120 and 122 as comprising the central rays, and it is very desirable that the prism structure be so designed that these rays are parallel to each other. Thus, as the prism means moves forward with the lens elements to change the objective field of focus, corresponding points of the adjacent image areas will be separated a constant distance.

It is preferable in this form of the invention to use a septum means for separating the beams. This can be accomplished by providing a septum number 127 extending from a point between the toes 117 and 118 to a point adjacent the film, this septum member usually terminating at a dividing wall 128 of a double-aperture plate 124.

Figure 2:
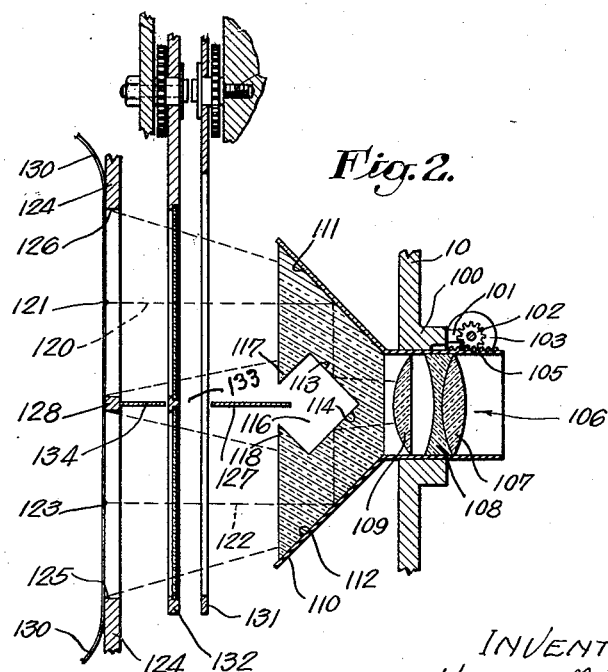
Fig. 2 is a diagrammatic sectional view of a modification.

In Fig. 2 I show an embodiment of the invention in which the septum means 127 extends rearwards from the prism means to a position adjacent the film. In this embodiment the septum means includes septum means 127 and 134, spaced end to end, so as to define a space 133 for a purpose to be hereinafter described. The septum means 127 is preferably secured to the camera housing by any suitable means and preferably extends into the groove 116 in the prism means. The septum 134 may be secured in fixed relation with the wall 128 of the aperture plate by any suitable means. This septum means acts to separate the two beams formed by the prism means. In this embodiment shown in Fig. 2, it is desirable to form a space 133, so that a shutter 131 or a color filter support 132, or both, may be positioned therein so as to intercept the beams of light passing through the prism means. This embodiment is particularly adapted for the exposing of color motion pictures wherein the adjacent image areas of the film 130 carry color value images. In accomplishing this result it is desirable to position a red color filter, for instance, in the path of the rays reaching one of the image areas, and to position a green color filter in the path of the rays reaching the other image area. The film thus carries alternate color images exposed through the same color or filter. The positioning of the filter support 132 and the shutter 131 to rotate in the space 133 is well understood by any one skilled in the art of color photography in the additive system.

It will be clear that the forms of the invention shown in Figs. 1 and 2 can be used in projection systems as well as in conjunction with a camera. In a projection system it is necessary that light rays passing through corresponding points on the adjacent image areas being projected must reach the screen at a common point. Stated in other words, in projecting adjacent image areas, these image areas will respectively form constituent images on the screen, but these constituent images must be in exact registration in order to obtain a composite image. Thus, if these constituent images are formed by projecting through color filters corresponding in color to those used in exposing color-value images on the film, the resulting composite image will appear in natural colors in accordance with the principles involved in the well-known additive system of color projection.

It should thus be clear that the invention is not limited in utility to a use in conjunction with a camera.

It will be clear that various changes may be made in the forms of the invention herein shown without departing from the spirit of the invention. It will also be clear that the invention finds utility regardless of whether or not color motion pictures are being produced. In the latter connection a double-exposure or double-projection black-and-white system permits a distinct saving in the amount of light necessary to expose the image areas, as well as in the amount of light which must be passed through each of these areas in projecting.

I claim as my invention:

1. Photographic apparatus for use with a film having adjacent film areas comprising, a double aperture film plate and guide, a barrel movable towards and away from said film plate containing a single lens system composed of one or more lens elements and a reflecting system in prism form, said reflecting system being located in said barrel between said lens system and said film, said reflecting system including two inner reflecting surfaces and two outer reflecting surfaces, said inner reflecting surfaces being disposed in alignment with said lens system whereby light rays moving through said lens system are reflected between said inner and outer reflective surfaces, the front and rear areas of said prism means being plane surfaces and parallel to each other, means for moving said barrel in a forward-rearward direction to change the objective field of focus of said lens system and holding same from angular movement to prevent lateral displacement of the images.

2. A combination as defined in claim 1 in which said prism means defines a groove bounding said inner reflecting surfaces and in which said prism means includes toes at the rear end of said groove, said toes extending towards each other.

3. A combination as defined in claim 1 in which said prism means defines a groove bounding said inner reflecting surfaces and in which said prism means includes toes at the rear end of said groove, said toes extending towards each other and including a septum means terminating adjacent the space separating said apertures of said double aperture film plate and extending forward between said toes and within said groove bounding said inner reflecting surfaces of said prism means.

4. A combination as defined in claim 1 which includes two septum members in alignment with each other but spaced end to end to define a space and in which said photographic apparatus includes a shutter and a color filter support moving through said space, said color filter support carrying a plurality of color filters successively intercepting the light rays passing through said prism means.

5. Photographic apparatus for use with a film having adjacent film areas comprising, a double aperture film plate and guide, a barrel movable towards and away from said film plate containing a single lens system composed of one or more lens elements and which barrel has a flared portion containing a reflecting system in prism form, said reflecting system being located in said barrel between said lens system and said film, said reflecting system including two inner reflecting surfaces and two outer reflecting surfaces, said inner reflecting surfaces being disposed in alignment with said lens system whereby light rays moving through said lens system are reflected between said inner and outer reflecting surfaces, the front and rear areas of said prism means being plane surfaces and parallel to each other, means for moving said barrel in a forward-rearward direction to change the objective field of focus of said lens system and holding same from angular movement to prevent lateral displacement of the images.

6. Photographic apparatus for use with a film having adjacent film areas comprising, a double aperture film plate and guide, a barrel movable towards and away from said film plate, containing a single lens system composed of one or more lens elements, and having a flared portion containing a reflecting system in prism form, said reflecting system being located in said barrel between said lens system and said film, said reflecting system including two inner reflecting surfaces and two outer reflecting surfaces, said inner reflecting surfaces being disposed in alignment with said lens system whereby light rays moving through said lens system are reflected between said inner and outer reflecting surfaces, the said reflecting system defining a groove bounding said inner reflecting surfaces and including toes at the rear end of said groove, said toes extending towards each other.

WILLIAM M. THOMAS.